UNITED STATES PATENT OFFICE.

MANUEL VINCENTE ROMEROGARCIA, OF NEW YORK, N. Y.

FOOD.

No. 800,683.   Specification of Letters Patent.   Patented Oct. 3, 1905.

Application filed August 1, 1905. Serial No. 272,235.

*To all whom it may concern:*

Be it known that I, MANUEL VINCENTE ROMEROGARCIA, a citizen of Venezuela, residing at New York, in the county of New York and State of New York, have invented a new and useful Food, of which the following is a specification.

This invention relates to improvements in foods, the objects being to provide a condensed and highly-nutritive food especially adapted for soldiers, prospectors, and sailors.

My improved food comprises ingredients as follows: kola, cocoa, banana flour or starch, sugar-cane, sarrapia or Guiana bean, papayin or papain. These ingredients are all ground together in a mass or pulp, and to them is added sufficient water to reduce the same to a proper consistency, after which they are pressed into cakes of convenient size and shape.

The proportions which I will give below can of course be varied; but I have found that those given answer the purpose and secure the desired result.

The ingredients are mixed in the following proportions: kola, two hundred parts; cocoa, two hundred parts; banana flour or starch, four hundred parts; sugar-cane, one hundred and fifty parts; sarrapia or Guiana bean, ten parts; papayin or papain, forty parts.

As will be observed, I contemplate using either banana-flour or banana-starch, the result being the same as well as the method of preparing, with the exception that less water is required when the starch is used than is required when the flour is used. This mass may be cooked or not, as desired.

The food thus produced will be found to be of a highly-nutritive quality, and therefore capable of sustaining life for an indefinite period, and at the same time it is very much condensed, is light, and cheap.

Having described my invention, what I claim is—

1. The herein-described food, the same comprising the following ingredients, namely, kola, cocoa, banana flour or starch, sugar-cane, sarrapia or Guiana bean, and papayin or papain, and water.

2. The herein-described food, the same consisting of the following ingredients mixed in substantially the proportions given, namely, kola, two hundred parts; cocoa, two hundred parts; banana flour or starch, four hundred parts; sugar-cane, one hundred and fifty parts; sarrapia or Guiana bean, ten parts; papayin or papain forty parts, and sufficient water to reduce the same to a proper consistency.

In testimony whereof I have signed my name to this specification in the presence of two subscribing witnesses.

MANUEL VINCENTE ROMEROGARCIA.

Witnesses:
  FRANK C. HALL,
  W. S. DUVALL.